Figure 1:
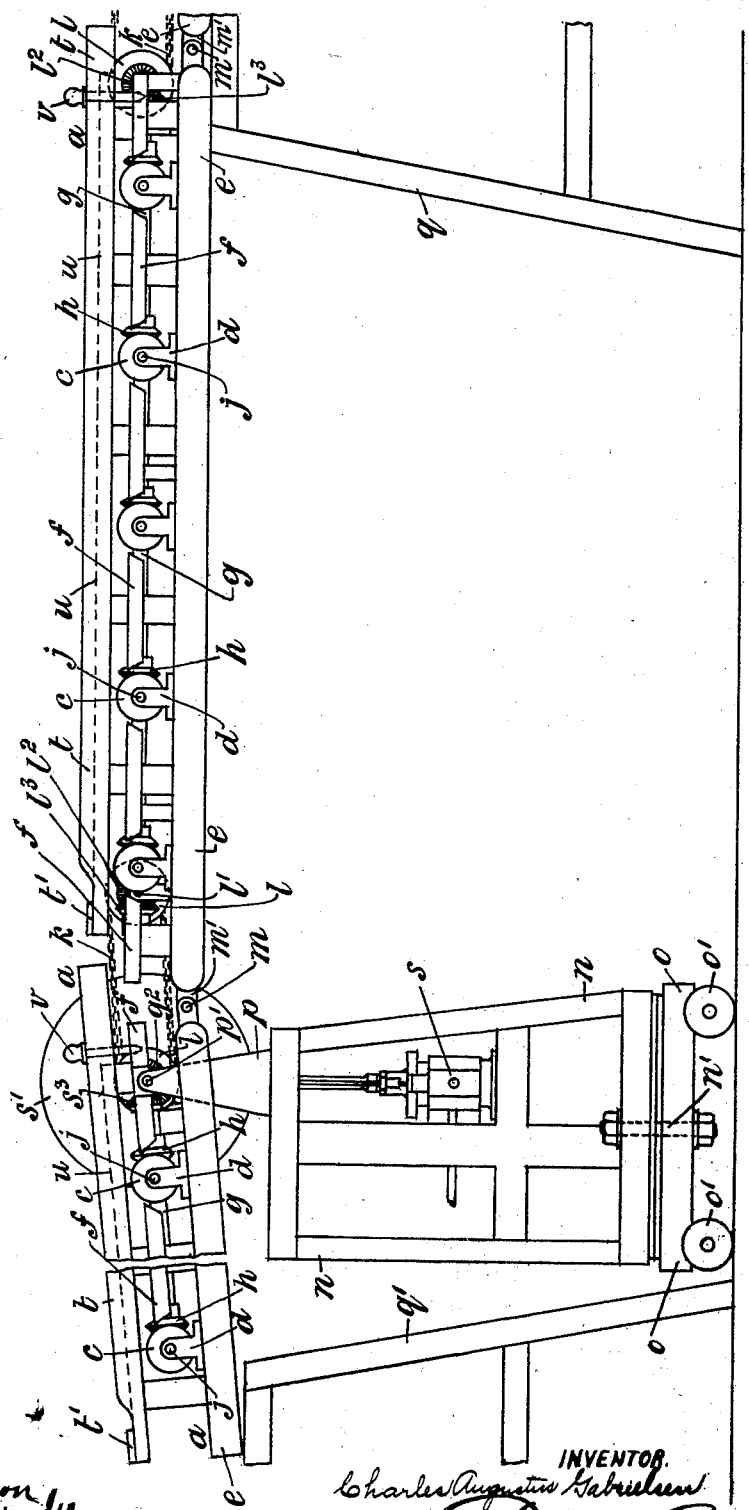

No. 714,889. Patented Dec. 2, 1902.
C. A. GABRIELSEN.
CONVEYER.
(Application filed Feb. 28, 1902.)
(No Model.) 2 Sheets—Sheet 1.

No. 714,889. Patented Dec. 2, 1902.
C. A. GABRIELSEN.
CONVEYER.
(Application filed Feb. 28, 1902.)
(No Model.) 2 Sheets—Sheet 2.
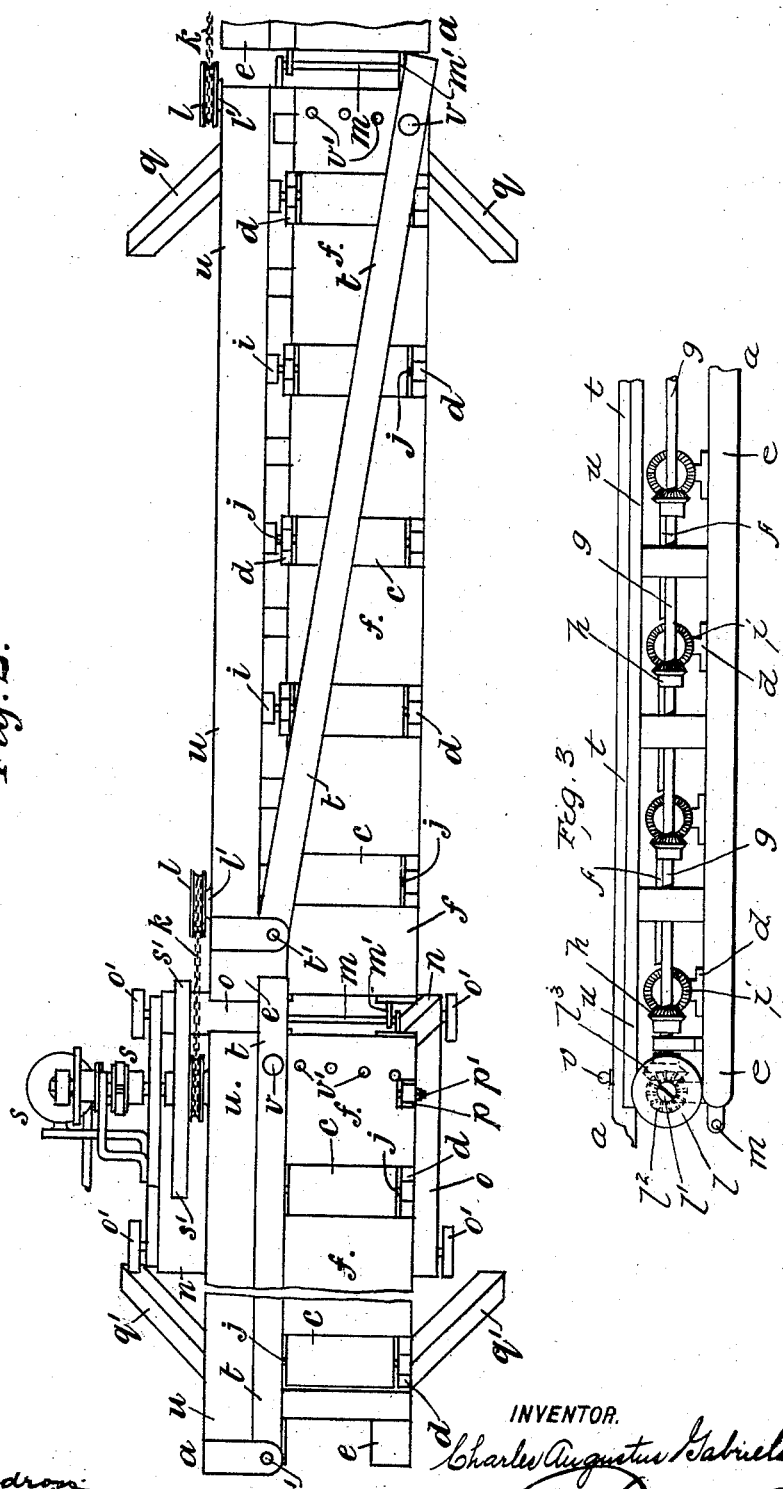
WITNESSES:
INVENTOR.
Charles Augustus Gabrielsen
BY
ATTORNEYS.

UNITED STATES PATENT OFFICE.

CHARLES A. GABRIELSEN, OF LIVERPOOL, ENGLAND.

CONVEYER.

SPECIFICATION forming part of Letters Patent No. 714,889, dated December 2, 1902.

Application filed February 28, 1902. Serial No. 96,171. (No model.)

*To all whom it may concern:*

Be it known that I, CHARLES AUGUSTUS GABRIELSEN, sailmaker, a subject of the King of England, and a resident of Liverpool, in the county of Lancaster, England, have invented certain new and useful Improvements in Conveyers, of which the following is a specification.

This invention has reference more particularly to conveying timber from one place to another—as, for instance, from a ship's side to a desired position on the quay or warehouse, and vice versa, or from wagons or other vehicles to a place of storage, or vice versa; and it has primarily for its object and effect to provide a mechanical means of conveying or transporting timber from one place to another—say from a ship's side to the place where it is required to be piled or stacked or otherwise, as above referred to; but it may also be used for the conveyance of other articles of equivalent or analogous kind—such as boxes of goods, bales, &c.

According to my invention a timber-conveyer comprises a plurality of conveyer sections or lengths suitably supported and connected together end to end and on or about the same level with each other, so that the article which is being conveyed will pass at one level from one platform to the other during its transit. The conveyer lengths or parts consist of a frame carrying a plurality of rollers, and these (or some of them) are constantly rotated through suitable "power-driven" gearing. The pieces of timber are placed upon the rotating rollers of the first conveyer length, and when they reach the place required they are caused to be removed by a device which displaces them laterally as they are traveling along and by which they are made to fall off sidewise in the required manner onto the ground or other place of deposit. In order that the conveyer may be readily placed and adjusted in the position required for use, one of the conveyer lengths (preferably the first) is hinged to a stand or supporting-frame which is pivoted to a baseplate and preferably mounted on wheels. By this arrangement the receiving end of the conveyer may be readily turned or fixed in the correct position for taking up the articles and adjusted as required. On this stand or frame the motor machinery may be conveniently fixed.

The invention will be further described with the aid of the accompanying drawings.

In the drawings, Figure 1 is a side elevation, and Fig. 2 a plan, of a conveyer according to my invention. Fig. 3 is a side elevation of a conveyer length viewed from the opposite side to that shown in Fig. 1.

Referring now to the drawings, $a$ designates generally the conveyer frames or platforms, and $c$ designates the rollers, these rollers being mounted in bearings $d$, supported on the under members $e$ of the frames or platforms. Between the rollers $c$ tables $f$ are provided, and, as shown in the drawings, the upper portions of the rollers project above the surface of these tables. These tables are supported from the frame members $e$. At one side of each of the roller-carrying frames or platforms a horizontal shaft $g$ is mounted, and this shaft is provided with bevel-wheels $h$, which gear with the bevel-wheels $i$, provided at the ends of the spindles $j$ of the rollers $c$, and so all the rollers are geared together and driven.

Motion is imparted from one conveyer length to another by means of sprocket-wheels $l$ on the ends of the shafts $l'$ and sprocket-chains $k$, passing over the wheels $l$. These wheels are geared to the conveyer-roller-operating shafts $g$ through bevel-wheels $l^2$ on the shafts $l'$ and bevel-wheels $l^3$ on the ends of the shafts $g$ and meshing with $l^2$.

The form of connection shown in the drawings by which the conveyer lengths are connected together consists of a rod or bar $m$, provided on the end of one length, with which the hooks $m'$ of another length engage. By this or equivalent hinged method of connection movement is permitted between the platforms, so that the ends of same may be raised and lowered as may be required, and, moreover, the lengths or frames may be readily connected and disconnected.

The supporting-stand $n$ of the conveyer length or frame from which power is taken is pivoted at $n'$ to the base $o$, which is carried on wheels $o'$, the conveyer length itself being hinged to the brackets or standards $p$ at $p'$, about which it can be moved up and down as required. A trestle or stand $q$ is used to support the adjacent ends of the lengths or frames, and a similar trestle $q'$ may be used when desired to support the loading end of the first conveyer length. These trestles may be removed when the stack of wood or other articles reaches the level of the conveyer.

In the construction illustrated the rollers of the conveyer are actuated by a steam-engine $s$, which is mounted on the pivoted stand $n$, motion being conveyed to the shaft $g$ and thence to the rollers through a spur-wheel $g^2$, connected with the inner side of fly-wheel $s'$, and which gears with a spur-wheel $s^3$, provided on the end of shaft $g$; but any suitable means of transmitting power to the moving parts of the conveyer may be employed—as, for instance, by an electric motor.

The means for displacing and removing the articles from the conveyer after being carried to the place required consists of devices which upon the articles coming into contact with them displace same and cause them to leave the conveyer at the side, the point at which the articles leave the conveyer depending upon the inclination of the displacer bar or device. The discharging or displacer device shown in the drawings consists of a bar $t$, pivoted at $t'$ to the side of the frames $a$, and when not in use rests against the side plate $u$ of the conveyer, standing over the driving-gear. In use one of the displacer-bars $t$ is moved out into the path of the timber or articles being conveyed and secured in the desired position by pins $v$, which fit in the sockets $v'$ on one of the tables $f$, Fig. 2. The bar $t$ is shown moved out in its extreme outward position.

In operation the timber (or other article) is loaded or placed in the leading end of the first frame $a$ and is moved forward by the rollers $c$ along same and from one length to another, and when it comes into contact with a displacer-bar $t$ it is generally forced off the side of the conveyer onto the ground or other place of deposit. Further, with regard to the handling of timber the conveyer will be preferably placed in a direction parallel with the position or direction of length of the stack on which timber is being piled in order that the pieces of timber may after leaving the conveyer be lifted up, carried away, and placed in position with the least possible work and greatest expedition; and if the pile is being built up near the side of the conveyer the conveyer may be moved forward as the pile grows.

In the drawings the rollers $c$ are shown as being all geared with the driving-shaft $g$, but, if desired, alternate rollers may be actuated, or some may be geared and some loose, according to the conditions of working the conveyer or requirements. It is also to be stated that while the particular forms or parts of the conveyer set forth with reference to and shown in the drawings are convenient and advantageous for conveying timber they nevertheless can be modified or equivalents used to meet modified or different requirements or special cases without departing from the invention claimed hereunder.

Having now described my invention, what I claim as new, and desire to secure by Letters Patent, is—

1. Apparatus for conveying timber, or articles of the kind herein referred to, comprising a plurality of movable conveyer lengths $a$ disposed end to end, and at the same level at such ends, each length having driven moving conveying-rollers $c$ geared together, and flexible transmission means extending between said roller-driving gearings of the said conveyer lengths; substantially as and for the purposes set forth.

2. Apparatus for conveying timber, or articles of the kind herein referred to, comprising a plurality of conveyer lengths disposed end to end, and at the same level, each length having driven moving conveying-rollers; and means connected with one of said lengths of the conveyer adapted to displace the goods sidewise, and discharge same off the conveyer; substantially as set forth.

3. In a timber or like conveying apparatus, frames, as $a$, loosely connected together, each containing a plurality of rollers $c$; a horizontal shaft $g$, and bevel-gearing by which said rollers are rotated; chain $k$ and sprocket-wheels $l$ for transmitting power from one frame to another; a stand $n$ pivoted at $n'$ to base $o$, upon which the hinged end of one of the frames $a$ is supported; and displacer or guide-bars $t$ pivoted at $t'$; as set forth with reference to and shown in the drawings.

In witness whereof I have hereunto set my hand in presence of two witnesses.

CHARLES A. GABRIELSEN.

Witnesses:
LAWR. GOODALL,
GEO. E. GODDING.